United States Patent [19]
Shah et al.

[11] 3,756,312
[45] Sept. 4, 1973

[54] HEAT TRANSFER SYSTEM FOR A CONTINUOUS LEAD EXTRUDER

[75] Inventors: Rajat R. Shah, New York; Floyd Hasselriis, Astoria, both of N.Y.

[73] Assignee: American Hydrotherm Corporation, New York, N.Y.

[22] Filed: Dec. 28, 1970

[21] Appl. No.: 101,922

[52] U.S. Cl.................. 165/26, 165/64, 165/86, 165/101
[51] Int. Cl............................................ F25b 29/00
[58] Field of Search ............... 165/2, 86, 87, 64, 165/26, 100, 101, 104

[56] References Cited
UNITED STATES PATENTS

| | | | |
|---|---|---|---|
| 2,338,691 | 1/1944 | Tucker | 165/104 |
| 2,780,443 | 2/1957 | Holloway | 165/100 |
| 3,419,068 | 12/1968 | Grierson | 165/101 |

*Primary Examiner*—Charles Sukalo
*Attorney*—Marn & Jangarathis

[57] ABSTRACT

A heat transfer system for a continuous lead extruder to provide desired operating temperatures in which heat transfer liquid is circulated in a plurality of heat transfer loops through heat transfer zones of the extruder and the temperature is separately controlled in each loop to provide the desired operating temperature for the extruder. The heat transfer loops include means for cooling the heat transfer liquid during extrusion and means for heating the heat transfer liquid during die changes.

9 Claims, 1 Drawing Figure

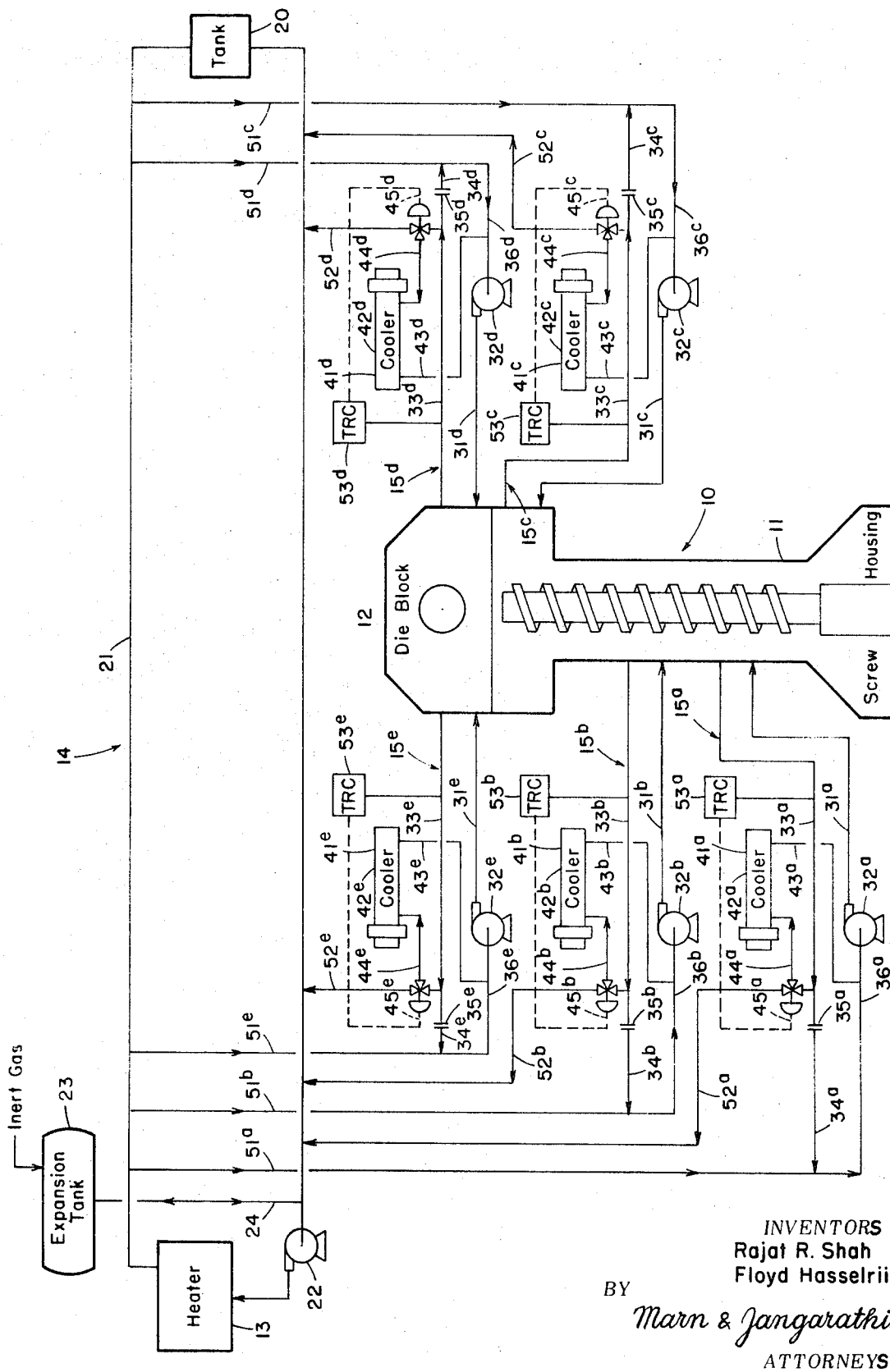

HEAT TRANSFER SYSTEM FOR A CONTINUOUS LEAD EXTRUDER

This invention relates to the extrusion of lead and more particularly to a temperature control system for controlling temperature during continuous lead extrusion.

A continuous lead extruder is employed for encasing rubber hose and a variety of cables with lead, the lead casing functioning to maintain the shape and finish of the hose or cable in a subsequent curing process. In such a lead extruder, the lead is introduced into a die block through a screw housing, and in the die block, the lead is extruded around the hose or cable to provide a lead jacket. The lead is introduced into the screw housing of the extruder at a temperature above the melting point of lead (M.P. 620° F.), and during passage through the screw housing, the temperature of the lead must be reduced to the extrusion temperature, a temperature slightly below the melting point of lead. Furthermore, there must also be means for controlling the temperature of the lead in the die housing in order to control the flow of lead and thereby insure proper extrusion of the lead around the hose or cable. In addition, periodically the die must be changed and in order to effect such a die change, the extruder; i.e., the screw housing and die block, must be heated to a temperature above the melting point of the lead to permit removal of the lead from the extruder. After the die is changed, the extruder must be cooled to operating conditions at which the lead is at a temperature immediately below its melting point; i.e., the lead is in a semi-solid state.

To date, lead extruders have been provided with electric heaters, either the band or bayonnet type, or induction heaters to provide the heating required during changing of the die. In addition, the extruder is provided with either full-flow water cooling or boiling-water cooling to control the temperature during the extrusion operation.

The prior art extruders employing the hereinabove noted temperature control means have required long die change times in the order of 2 hours which results in lost production time. In addition, the cooling which is effected during the extrusion operation was not capable of being precisely controlled which resulted in erratic flow of the lead which in turn decreased the production capacity of the machine. In general, the extruders operated at production rates lower than their rated capacity.

An object of the present invention is to provide for improved temperature control for a lead extruder.

A further object of this invention is to control the temperature of a continuous lead extruder in a manner which reduces die change time.

Another object of the present invention is to more precisely control the temperature of a continuous lead extruder to provide increased production capacity.

These and other objects of the invention should be more readily apparent from reading the following detailed description thereof with reference to the accompanying drawing wherein:

The drawing is a simplified schematic diagram of an embodiment of the invention.

The objects of this invention are broadly accomplished by dividing the lead extruder into a plurality of heat transfer zones, continuously circulating a heat transfer liquid through each of the heat transfer zones and controlling the temperature of the heat transfer liquid flowing through each of the heat transfer zones to provide and maintain a preselected temperature in each of the heat transfer zones of the extruder.

More particularly, each of the heat transfer zones of the extruder is provided with a temperature control loop or circuit through which a heat transfer liquid is continuously circulated through the heat transfer zone of the extruder, and each of the temperature control loops is provided with a cooling loop or circuit, including a cooler, through which heat transfer liquid is circulated from the temperature control loop through the cooler and back to the temperature control loop. There is also provided a heating loop or circuit, including a heater, which is connected to each temperature control loop for circulating heat transfer liquid from each temperature control loop through the heater and back to the respective temperature control loop. A flow control means, including a temperature responsive element, is provided for each temperature control loop and is connected to the temperature control loop, the cooling loop for the temperature control loop and the heating loop, the flow control means controlling the amount of liquid passed from the temperature control loop through the cooler and back to the temperature control loop during the cooling portion of the cycle, and controlling the amount of liquid passed from each temperature control loop through the heater and back to the temperature control loop during the heating portion of the cycle. The temperature responsive element is set to provide and maintain a preselected temperature for each heat transfer zone of the extruder and operates the flow controller to proportion the amount of flow of heat transfer liquid to the cooler, during cooling, and to the heater, during heating, to provide and maintain the preselected temperatures.

During extrusion, cooling is required to maintain the lead at the desired extrusion temperature, and the temperature of the heat transfer liquid, in each temperature control loop, may be separately regulated to provide and maintain the preselected desired lead temperature in each heat transfer zone of the extruder.

In the event of a die change, heating is required, and each temperature control loop is now connected to the heating loop to provide and maintain the required higher temperature for maintaining the lead in a molten state.

After the die is changed, each temperature control loop is connected to its cooling loop to cool the extruder to the desired lower extrusion temperature and to maintain such temperatures.

The invention will be further described with reference to the accompanying drawing which is illustrative of an embodiment of the present invention. It is to be understood, however, that the scope of the invention is not to be limited thereby.

Referring to the drawing, there is shown a continuous lead extruder 10 comprised of a screw housing 11 and a die block 12 and a forced circulation liquid heat transfer system having as its principal elements a heater 13, a heating loop 14, and a plurality of temperature control loops 15a, 15b, 15c, 15d and 15e for maintaining the required temperature in the extruder 10 by circulating therethrough a suitable heat transfer liquid, such as a eutectic mixture comprised of 26.5 percent diphenyl and 73.5 percent diphenyl oxide, by weight, in particular the heat transfer liquid sold under the mark DOWTHERM A.

The heater 13 may be any of a wide variety of heaters known in the art, such as an electric heater, a fired heater, an indirect heat exchanger or the like to provide heat to the heat transfer liquid flowing therethrough. The inlet and outlet of the heater are connected by the heating loop 14 comprised of an accumulator tank 20 and line 21 which includes a pump 22 to maintain fluid flow through the heater 13. An expansion tank 23 is connected to the heating loop 14 through line 24, and the operating pressure of the heat transfer system (the operating pressure is a pressure which maintains the heat transfer fluid as a liquid at the operating temperatures) is maintained by applying an inert gas, such as nitrogen, to the heat transfer liquid in the expansion tank 23.

The temperature control loops and their respective cooling loops (five are particularly shown, three for the screw housing and two for the die block, but it is to be understood that more or less temperature control and cooling loops may be employed and that they may be divided between the die block and screw housing as required) are identical in structure to each other and accordingly only one of the temperature control loops and its respective cooling loop will be particularly described.

The temperature control loop 15a for circulating a heat transfer liquid through the extruder 10 includes an inlet conduit 31a connected to the high pressure side of pump 32a for introducing heat transfer liquid into the screw housing 11 of extruder 10, and an outlet conduit 33a for withdrawing heat transfer liquid from the screw housing 11. The outlet conduit 33a is connected to a by-pass conduit 34a, including a flow controller, such as orifice 35a, the by-pass conduit 34a being connected to conduit 36a which is connected to the low pressure side of pump 32a. The temperature control loop for circulating heat transfer liquid through a heat transfer zone in the screw housing 11 of extruder 10 is therefore comprised of inlet conduit 31a, outlet conduit 33a, by-pass conduit 34a, conduit 36a and pump 32a.

The cooling loop 41a includes a cooler 42a, of a type known in the art for reducing the temperature of the heat transfer liquid passing therethrough, and the outlet of the cooler 42a is connected to conduit 36a of the temperature control loop through conduit 43a. The inlet of cooler 42a is connected to the outlet conduit 33a of the temperature control loop through inlet conduit 44a, three-way flow control valve 45a and conduit 46a.

The heating loop 14 is connected to the temperature control loop 15a through conduit 51a and heated heat transfer liquid is introduced therethrough into conduit 36a of temperature control loop 15a. The heating loop 14 is also connected to temperature control loop 14 through conduit 52a and heat transfer liquid is withdrawn from temperature control loop 15a through flow control valve 45a and conduit 52a for introduction into the heater 13.

During the extrusion operation, the temperature control loop 15a is employed to cool the screw housing 11 to initially cool the molten lead to a temperature slightly below its melting point and to also prevent the lead which passes therethrough from being heated, by friction, to a temperature which is above the desired extrusion temperature; i.e., a temperature at which the lead is in a semi-solid state. A temperature controller 52a which is responsive to liquid temperature in conduit 33e and is operatively connected to flow controller 45a maintains a predetermined heat transfer liquid temperature in outlet conduit 33a, a temperature which has been calculated to correspond to the desired temperature in the portion of the screw housing through which the heat transfer liquid is circulated. If the temperature of the heat transfer liquid in outlet conduit 33a exceeds the predetermined temperature, the temperature of the lead is also in excess of the desired temperature, and further cooling is required to maintain the desired lead temperature. The temperature controller 53a is operatively connected to the flow control valve 45a to direct the heat transfer liquid, as hereinafter described, in a manner which provides the predetermined liquid temperature in outlet conduit 33a and accordingly also the desired lead temperature in the screw housing 11.

During the cooling portion of the cycle, there is no flow to the heating loop 14 through conduit 52a and no flow from the heating loop 14 through conduit 51a. The heat transfer liquid withdrawn from the screw housing 11 through conduit 33a is directed to either the cooler 42a, by-pass conduit 34a or both the cooler 42a and by-pass conduit 34a.

Thus, for example, during extrusion the liquid withdrawn from the screw housing 11 through conduit 33a is at the predetermined temperature and a first portion of this liquid is passed through conduit 46a, flow control valve 45a, conduit 44a, cooler 42a and conduit 43a, and the remaining portion is passed through the by-pass conduit 34a, the first portion and remaining portion being combined in conduit 36a and introduced into the screw housing 11 through conduit 31a. In the event that the temperature controller 53a senses a temperature in conduit 33a which exceeds the preselected temperature, the temperature controller 53a operates control valve 45a to increase the flow to cooler 42a, resulting in a corresponding decrease in flow through by-pass conduit 34a. The increase in liquid flow to cooler 42a, and the corresponding decrease in liquid flow through by-pass conduit 34a, decreases the temperature of the liquid introduced into the screw housing 11 through conduit 31a which provides additional cooling to maintain the preselected liquid temperature in conduit 33a, thereby also maintaining the desired lead extrusion temperature.

In the event that the temperature controller 53a senses a temperature in conduit 33a which is less than the preselected temperature, the temperature controller 53a operates control valve 45a to decrease the flow to cooler 42a, resulting in a corresponding increase in flow through by-pass conduit 34a. The decrease in liquid flow to cooler 42a and the corresponding increase in liquid flow through by-pass conduit 34a increases the temperature of the liquid introduced into the screw housing 11 through conduit 31a, which reduces the temperature of the heat transfer liquid to thereby maintain the preselected liquid temperature in conduit 33a, thereby also maintaining the desired lead extrusion temperature.

It should be readily apparent that the temperature control loop provides and maintains a preselected temperature in conduit 33a with constant flow therethrough.

During the extrusion operation there are no heating requirements and, consequently, the heat transfer liquid flows continuously through the heating loop, without being circulated through any of the temperature control loops.

In the event of a die change, the lead extruder requires heating to heat the lead to above the melting point thereof, whereby the lead may be drained from the extruder. The temperature controller 53a is then reset to maintain a preselected temperature in conduit 33a which is higher than the preselected temperature maintained during extrusion.

The die change requires rapid heating of the extruder and, accordingly, during the initial portion of the heating cycle full heating will be required to provide the higher temperature. The temperature controller operates flow control valve 45a to direct essentially all of the liquid withdrawn from the screw housing 11 through conduit 52a to the heating loop 14, resulting in a corresponding flow of heated liquid from the heating loop through conduits 51a and 36a to the screw housing 11. The heated liquid accumulated in accumulator 20 provides an additional heat source which aids in the rapid heating of the extruder.

Eventually, the liquid withdrawn from the screw housing 11 through conduit 33a reaches the preselected temperature, and flow is proportioned by the flow control valve 45a between conduit 44a and conduit 34a to maintain the preselected temperature in conduit 33a. Thus, if the temperature controller 53a senses a temperature which is less than the preselected temperature, the temperature controller 53a operates the control valve 45a to increase the flow of heat transfer liquid to the heating loop 14 through conduit 52a, resulting in a corresponding decrease in the flow of heat transfer liquid through by-pass conduit 34a, with the flow to the screw housing 11 through conduit 31a remaining constant. The increase in flow to the heating loop increases the temperature of the heat transfer liquid flowing through the screw housing.

Similarly, if the temperature controller 53a senses a temperature which is in excess of the preselected temperature, the temperature controller 53a operates the control valve 45a to decrease the flow of heat transfer liquid to the heating loop 14, resulting in a corresponding increase in the flow of liquid through by-pass conduit 34a, with the flow to the screw housing 11 through conduit 31a remaining constant. The decrease in flow to the heating loop 14 reduces the temperature of the heat transfer liquid flowing through the screw housing 11.

After changing the die, the extruder must be cooled and the temperature controller 53a is reset to provide the selected lower operating temperature for the extrusion. In the cooling of the extruder, essentially all of the heat transfer liquid flows through the cooler 42a to effect rapid cooling of the extruder 10 to the desired operating temperature, and after such cooling, the flow of heat transfer liquid is proportioned between by-pass 34a and the cooler 42a, as hereinabove described, to maintain the selected operating temperature.

The operation of the system has been particularly described with reference to the temperature control loop 15a, but it is to be understood that the other temperature control loops are similarly operated. The temperature of the heat transfer liquid in each temperature control loop is separately regulated to maintain the desired lead temperature in the extruder. Thus, the cooling requirements for maintaining the lead at a temperature below the melting temperature thereof increases as the lead progresses through the screw housing and, consequently, the heat transfer liquid temperature required to maintain the lead at the proper extrusion temperature decreases over the length of the screw housing. The system of the present invention is capable of providing such heat transfer liquid temperature differentials.

The temperature of the lead in the die block is also regulated to provide the desired extrusion temperature and to control the flow of lead through the die. The heat transfer liquid temperature in each temperature control loop for the die may be separately controlled to provide the required extrusion temperature and to control the flow of lead.

Numerous modifications and variations of the hereinabove described embodiment are possible within the spirit and scope of the invention. Thus, for example, the temperature controller is particularly described as reading the heat transfer liquid outlet temperature for maintaining a preselected temperature in its heat transfer zone of the extruder, but it should be apparent that the temperature controller could be responsive to either the heat transfer liquid inlet temperature or the extruder temperature, although the particularly described temperature reading is preferred.

Similarly, the proportioning of the flow to the cooler or heater may be controlled in a manner other than the three-way control valve particularly shown.

The above modifications and other should be apparent to those skilled in the art from the teachings herein.

The present invention provides a marked improvement in the operation of a continuous lead extruder. During extrusion, precise temperature control may be maintained throughout the extruder, thereby eliminating the erratic flow of lead encountered in prior art systems, and increasing the production of the extruder. In addition, the time for changing a die in the system of the present invention requires in the order of two-thirds to three-quarters less time than the die change times required in prior art systems.

These advantages and others should be apparent to those skilled in the art from the teachings herein.

Numerous variations of the present invention are possible and therefore the invention may be practised within the scope of the appended claims in a manner other than as particularly described.

What is claimed is:

1. In combination with a continuous lead extruder having a plurality of heat transfer zones, a heat transfer system, comprising:

means comprising a temperature control circuit for each of the heat transfer zones for continuously circulating a heat transfer liquid through each of the heat transfer zones of the extruder; a cooler for each temperature control circuit; means for each temperature control circuit for diverting heat transfer liquid from the temperature control circuit through the cooler and returning the cooled heat transfer liquid to the temperature control circuit; and control means for controlling the amount of liquid diverted from each temperature control circuit through the cooler to control the temperature of the heat transfer liquid in each temperature control circuit to provide and maintain a selected temperature in each heat transfer zone of the extruder during cooling.

2. The combination as defined in claim 1 and further comprising:

a heater; means for each temperature control circuit for diverting heat transfer liquid from the temperature control circuit through the heater and returning the heated heat transfer liquid to the temperature control circuit, said control means for each heat transfer loop also controlling the amount of heat transfer liquid diverted from each temperature control circuit through the heater to control the temperature of the heat transfer liquid in each temperature control circuit to provide and maintain a selected temperature in each heat transfer zone during heating.

3. The combination as defined in claim 2 wherein the control means includes temperature responsive means responsive to the temperature of the heat transfer liquid in each temperature control circuit, said temperature responsive means changing the amount of liquid flow through the heater and cooler in response to variations in temperature of the heat transfer liquid in the temperature control circuit.

4. In combination with a continuous lead extruder having a plurality of heat transfer zones, a heat transfer system, comprising:

a. a temperature control loop for each heat transfer zone for circulating a heat transfer liquid through the heat transfer zone in a continuous flow loop;

b. a cooling loop for each temperature control loop including a cooler, said cooling loop being connected to its respective temperature control loop for circulating heat transfer liquid from the temperature control loop through the cooler and back to the temperature control loop;

c. a heating loop including a heater, said heating loop being connected to each temperature control loop for circulating heat transfer liquid from each temperature control loop through the heater and back to each temperature control loop; and d. control means for each temperature control loop, connected to the temperature control loop, its respective cooling loop and the heating loop, to connect the temperature control loop to the heating loop for a heating cycle and to the cooling loop for a cooling cycle, said control means, during cooling, controlling the amount of heat transfer liquid passed from the temperature control loop through the cooler to provide and maintain a preselected temperature in the heat transfer zones of the extruder, and said control means, during heating, controlling the amount of heat transfer liquid passed from the temperature control loop through the heater to provide and maintain a preselected temperature in the heat transfer zones of the extruder.

5. The combination as defined in claim 4 wherein the control means includes a temperature responsive means responsive to the temperature in its respective heat transfer zone of said extruder, a three-way control valve having an inlet port and two outlet ports, said inlet port-being connected to the temperature control loop, the first outlet port to the cooler and the second outlet port to the heater, said temperature responsive means being operatively connected to the control valve to control the amount of liquid passed from the inlet port to the first outlet port to maintain a preselected temperature during cooling and to control the amount of liquid passed from the inlet port to the second outlet port to maintain a preselected temperature during heating.

6. In combination with a continuous lead extruder, having separate heat transfer zones, means for continuously circulating a heat transfer liquid in separate circuits through each of the separate heat transfer zones in said extruder for separately maintaining each of said heat transfer zones at a pre-selected temperature; and temperature control means for separately regulating the temperature of the circulating heat transfer liquid in said separate circuits at a pre-selected temperature to thereby separately maintain the temperature in each of said heat transfer zones, said temperature control means comprising heat exchange means and flow control means for each of said separate circuits, said flow control means controlling the amount of heat transfer liquid diverted from each of said circuits through the heat exchange means for said circuit to maintain the circulating heat transfer liquid at said pre-selected temperature.

7. The combination of claim 6 wherein said temperature control means further includes temperature responsive means responsive to the temperature of the heat transfer liquid circulating in each circuit, said temperature responsive means being operatively connected to said flow control means, said flow control means controlling the amount of heat transfer liquid diverted from each of said circuits through said heat exchange means in response to temperature of the heat transfer liquid sensed by said temperature responsive means in said circuit.

8. The combination of claim 7 wherein said heat exchange means comprises a cooler for each circuit.

9. The combination of claim 8 wherein said heat exchange means further comprises a heater.

* * * * *